(12) United States Patent
Cazes et al.

(10) Patent No.: US 10,814,761 B2
(45) Date of Patent: Oct. 27, 2020

(54) SEAT COMPRISING A SWIVEL ARMREST MODULE

(71) Applicant: Faurecia Sièges d'Automobile, Nanterre (FR)

(72) Inventors: Christophe Cazes, Versailles (FR); Claude Duboulet, Etrechy (FR); Jacques Robert, Marcoussis (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 0 days.

(21) Appl. No.: 15/958,905

(22) Filed: Apr. 20, 2018

(65) Prior Publication Data
US 2018/0304787 A1    Oct. 25, 2018

(30) Foreign Application Priority Data
Apr. 20, 2017    (FR) ..................... 17 53454

(51) Int. Cl.
*B60N 2/75* (2018.01)
*B60N 2/42* (2006.01)
*B60N 2/02* (2006.01)

(52) U.S. Cl.
CPC ........... *B60N 2/753* (2018.02); *B60N 2/4235* (2013.01); *B60N 2/77* (2018.02); *B60N 2002/0256* (2013.01)

(58) Field of Classification Search
CPC ........ B60N 2/753; B60N 2/77; B60N 2/4235; B60N 2002/0256; A47C 7/543
See application file for complete search history.

(56) References Cited

U.S. PATENT DOCUMENTS

| 4,244,623 | A | * | 1/1981 | Hall | A47C 1/03 297/411.36 |
|---|---|---|---|---|---|
| 4,307,913 | A | * | 12/1981 | Spiegelhoff | A47C 1/03 297/411.33 |
| 5,795,025 | A | * | 8/1998 | Murphy | B60N 2/77 297/411.36 |
| 6,460,932 | B1 | * | 10/2002 | Kopish | A47C 1/03 248/118.3 |
| 2007/0200414 | A1 | * | 8/2007 | Pozzi | B60N 3/001 297/411.32 |
| 2017/0101188 | A1 |   | 4/2017 | Augé et al. | |

FOREIGN PATENT DOCUMENTS

| EP | 2033851 A2 | 3/2009 |
|---|---|---|
| FR | 2841510 A1 | 1/2004 |
| JP | 2016210272 A | 12/2016 |

OTHER PUBLICATIONS

French Search Report for application No. FR 1753454, dated Jan. 9, 2018, 2 pages.

* cited by examiner

*Primary Examiner* — Philip F Gabler
(74) *Attorney, Agent, or Firm* — Reising Ethington P.C.

(57) ABSTRACT

A vehicle seat having a backrest, a seat extending in a transverse direction from a first side edge to a second side edge, and a seat module. The armrest module includes a body and an armrest supported by this body, and is able to move relative to the seat between a home position where the armrest laterally extends the seat or is lower than the seat so as to be able to receive an occupant, and a rest position where the armrest is higher than the seat so as to be able to receive the arm of the occupant sitting on the seat. The armrest module has a substantially flat shape in a vertical plane, and has a thickness extending in the transverse direction.

11 Claims, 4 Drawing Sheets

SEAT COMPRISING A SWIVEL ARMREST MODULE

TECHNICAL FIELD

The present invention relates to a vehicle seat having a backrest, a seat that extends transversely from the first side edge to the second side edge, and an armrest module.

In the following description, the terms "front" and "rear" are defined with respect to the seating area of the seat, the rear edge of the seat being the edge which is extended vertically by the back of the seat, and the front edge being the edge opposite to the back edge.

In the following description, the terms "top"/"top" and "bottom"/"bottom" are defined relative to the seat cushion in its usual horizontal position.

BACKGROUND

Vehicle seats, in particular automobile seats, are known to comprise an armrest module. An example of such module 40A is shown in FIG. 7, with a seat 10A substantially comprising a horizontal seat 20A and a backrest 30A. This module 40A comprises an armrest 42A which mainly extends along a longitudinal axis XA. The module 40A is fixed on the backrest 30A and is articulated with the latter by a pivot connection 45A around a pivot axis ZA (perpendicular to the plane of FIG. 7). Thus, armrest 42A is able to pivot in a vertical plane, between the first position in alignment with backrest 30A, where the longitudinal axis XA is aligned with backrest 30A, and the second position where the longitudinal axis XA is perpendicular to backrest 30A and is substantially horizontal.

In the first position, the occupant can sit on seat 20A approaching it in the direction of the pivot axis ZA.

In the second position (shown in FIG. 7), armrest 42A is adapted to receive the arm of the occupant sitting on seat 20A of seat 10A.

Such a seat nevertheless has disadvantages.

Since the seat is located in the passenger compartment of the vehicle, for example an automobile, the access to the seat by a person is complicated by factors such as the door frame or the dashboard surrounding the seat, even when the armrest is retracted to the first position.

SUMMARY

The present invention aims to remedy these disadvantages.

The invention aims to provide a vehicle seat that is more easily accessible for an occupant, while providing an armrest for his arm.

This object is achieved by the fact that the armrest module comprises a body and an armrest supported by this body, and in that it is able to move relative to the seat. This movement is carried out between the home position where the armrest extends laterally to the seat or is lower than the seat so as to be able to receive an occupant, and a rest position where the armrest is vertically higher than the seat so as to be able to receive the arm of the occupant sitting on the seat. The armrest module, having a substantially flat shape in a vertical plane, has a thickness that extends in the transverse direction T.

With these provisions, the occupant can more easily access the seat with the armrest in the home position of the armrest module, while enjoying support for his arm once he sits on the seat when it is in the rest position.

Advantageously, the armrest is slidable vertically relative to the body. It is adjustable in height between high and low when the armrest module is in the rest position.

Thus, regardless of the seat occupant's body type, his forearm resting on the armrest will be at an optimal height relative to his chest, allowing him to sit in a more comfortable position.

Advantageously, the displacement of the armrest module relative to the seat comprises rotation of a pivot connection around pivot axis Z, which is directed transversely to the seat.

Thus, the movement of the module between the home position and the rest position is simplified.

Advantageously, the armrest module is articulated by the pivot connection to the seat.

Thus, the joint between the armrest module and the seat is simpler, since the home and rest positions are defined relative to the seat.

Advantageously, the displacement of the armrest module from the home position to the rest position is performed with a rotation of the front portion of the armrest module toward the rear of the seat to bring this front portion closer to the backrest.

Thus, the rear of the armrest module pivots forward and clears the articulation area of the backrest with the seat in the rest position. This frees up a passage space for the seat belt.

Advantageously, the passage of the armrest module from the home position to the rest position is effected with a rotation of the rear portion of the armrest module towards the front of the seat to move this back part away from the backrest.

Thus, the front of the armrest module pivots backwards and clears the lateral area of the front of the seat, which allows easier passage of the occupant's legs on the seat when he sits there.

Advantageously, the armrest has an L shape so that it comprises a branch which constitutes the upper part of the armrest module in the home position.

Thus, the armrest covers the upper body of the armrest module both in the home position and in the rest position.

Advantageously, the armrest module comprises a part which constitutes a protection in the event of lateral impact.

Thus, the user's pelvis, which is located behind the armrest module in a direction transverse to the seat, is better protected in case of side impact/transverse impact on the vehicle.

Advantageously, the armrest module has an elongated shape along a longitudinal axis X perpendicular to the pivot axis Z. The longitudinal axis X substantially extends horizontally in the home position and vertically in the rest position.

Thus, the armrest module has a shape in a plane perpendicular to the pivot axis Z which is similar to that of the seat.

BRIEF DESCRIPTION OF THE FIGURES

The invention will be better understood and its advantages will appear better by reading the detailed description below. An embodiment is shown by way of non-limiting example. The description refers to the accompanying drawings in which.

DETAILED DESCRIPTION

Figure 1:
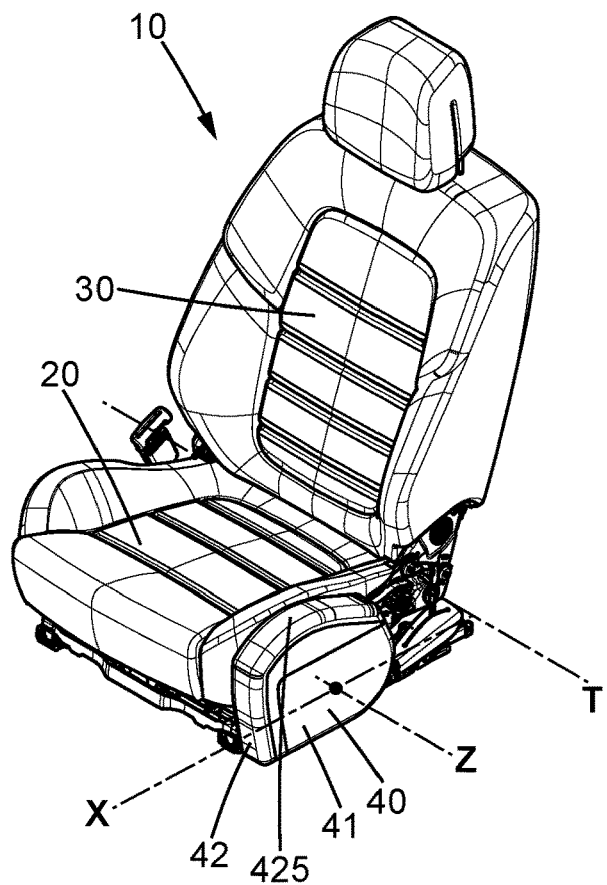
FIG. 1 is a perspective view of a seat according to the invention, with the armrest module in the home position.

FIG. 1 represents a vehicle seat 10 according to an embodiment of the invention, for example a motor vehicle seat. Vehicle seat 10 comprises a seat 20 (on which an occupant is intended to sit), with a front edge, and a rear edge located opposite the front edge, a backrest 30 which is connected to the rear edge and which extends this backrest 30 in a plane substantially perpendicular to the plane of seat 20.

In the following description, seat 10 is in its usual position, with seat 20 extending substantially in a horizontal plane, and backrest 30 extending substantially in a vertical plane.

Seat 20 extends in a transverse direction T (shown in FIG. 1) from a first lateral edge to a second lateral edge.

For example, backrest 30 is articulated on the rear edge of seat 20, so that backrest 30 is able to pivot around an axis extending in the transverse direction, by tilting forward or towards the rear of seat 20 around a plane perpendicular to the plane of seat 20.

Seat 10 further comprises an armrest module 40.

For example, module 40 is located on the left side of seat 10.

Armrest module 40 is connected to the rest of seat 10 and is located against the first lateral edge of seat 20. The module 40 has a substantially flat shape, in a vertical plane, with a thickness that extends in the transverse direction T. By substantially flat shape, it is meant that two dimensions of module 40 are each greater than three times the third dimension (thickness) of this module 40. For example, greater than five times the third dimension. For example, greater than ten times the third dimension.

The armrest module 40 comprises a body 41 and an armrest 42 supported by this body 41.

The module 40 moves relative to seat 20 between a home position and a rest position.

For example, this displacement comprises a rotation so that module 40 is pivotable relative to seat 20 by a pivot connection 45 to a pivot axis Z, which is directed transversely relative to seat 20.

This movement consists exclusively of this pivoting, which has the advantage of simplicity.

Alternatively, this movement further comprises another movement, for example, a translation.

Advantageously, module 40, in the home position, does not protrude forward of the front end of seat 20. That is to say that the front end of seat 20 is located further forward of the front end of module 40.

With this arrangement, the occupant can, in the home position of the armrest module 40, easily access seat 10 since module 40 is not located on the leg path of this occupant when he sits on seat 10.

This access to seat 10 by an occupant is thus facilitated regardless of whether the armrest module has a substantially flat shape on a vertical plane or not.

The above provision constitutes a second method which contributes to solving the problem of accessibility to seat 10 by an occupant. The fact that the armrest module has a substantially flat shape on a vertical plane with a thickness that extends in the transverse direction T, constitutes the first method that contributes to solving this problem.

The case where the movement consists exclusively of a pivot is described below. However, the description below also applies to the general case.

The home position is shown in FIG. 1. In this position armrest module 40 extends laterally from seat 20. The upper surface of armrest module 40 is then in the extension of the upper surface of seat 20 in the transverse direction T, and thus contributes to expanding the surface of seat 20 in this transverse direction. The upper surface of module 40 may alternatively be lower (vertically) than the upper surface of seat 20. Thus, an occupant who usually enters the vehicle in the transverse direction T is able to hold on to the module armrest 40 while trying to be seated eventually on seat 20. The sitting of the occupant on the seat 10 is thus facilitated.

Figure 2:
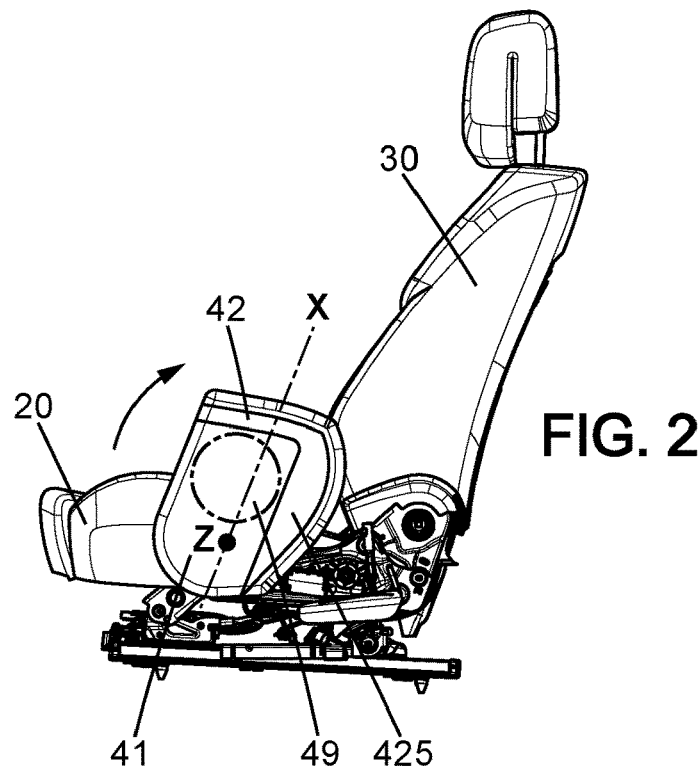
FIG. 2 is a side view of the seat of FIG. 1, with the armrest module in the rest position.

Once seated on seat 20, the occupant can raise module 40 by pivoting it around the pivot axis Z in its rest position, as shown in FIG. 2 (the pivot axis Z is perpendicular to the plane of FIG. 2).

As represented in FIGS. 1 to 6, the armrest module 40 is articulated by the pivot connection 45 to seat 20 by an articulating mechanism which connects module 40 to seat 20.

Thus, the joint between armrest module 40 and seat 10 is simpler, since the reception and rest positions are defined relative to seat 20.

Alternatively, armrest module 40 is articulated by a pivot connection 45 to backrest 30.

In its rest position (shown in FIGS. 2 and 3), armrest 42 is vertically higher than the lateral edge of seat 20 so as to be able to receive an arm of an occupant sitting on seat 20.

Figure 3:
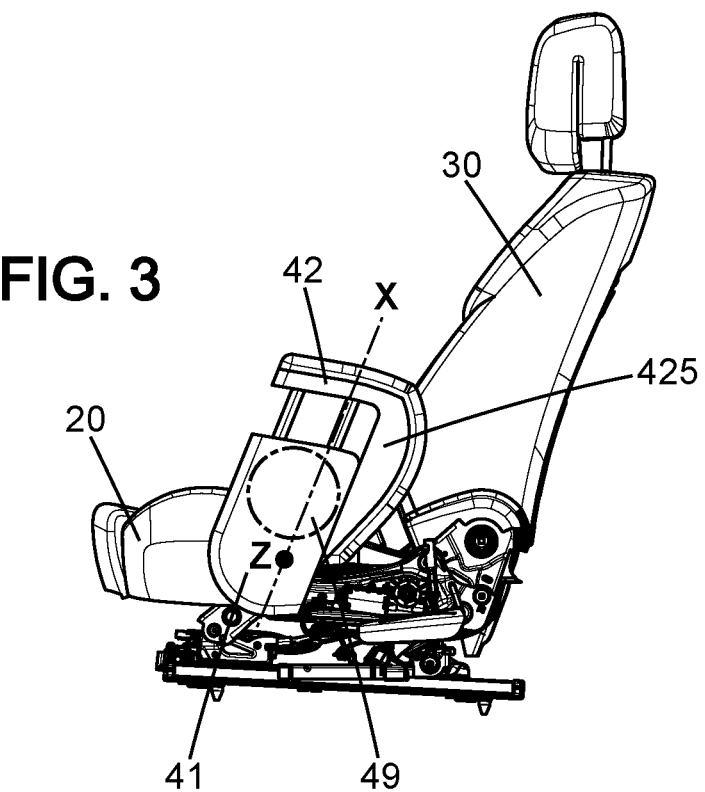
FIG. 3 is a side view of the seat of FIG. 1, with the armrest module in the rest position and the armrest in the raised position relative to the armrest body.

In the embodiment shown in FIGS. 1 to 3, the movement of armrest module 40 from the home position to the rest position is effected by a rotation of the front portion of the module 40 towards the rear of seat 20 and upwards to bring this front part closer to backrest 30.

This rotational movement is effected according to the arrow shown in FIG. 2, in the clockwise direction, with seat 20 located in the background of module 40.

Optionally, as shown in FIGS. 1 to 3, the pivot axis Z of the pivot connection 45 is located towards the rear (in the rear part in the home position) of armrest module 40.

Thus, advantageously, the rear of armrest module 40 (behind the pivot axis Z in the home position) pivots forward and clears the articulation area of backrest 30 with seat 20 in the rest position. This frees a passage space for the seat belt 10.

Advantageously, as shown in FIGS. 1 to 3, armrest 42 is L-shaped, so that it comprises branch 425 which constitutes the upper part of module 40 in the home position and which covers body 41 in this position. In this home position (shown in FIG. 1), armrest 42 laterally extends seat 20. The upper surface of armrest 42 (in this case of branch 425) is then in the extension of the upper surface of seat 20 in the transverse direction T, and thus contributes to expanding the surface of seat 20 in this transverse direction. The upper surface of armrest 42 may also be below the upper surface of seat 20, for example slightly below, for example about 10 cm.

The upper surface of armrest 42 is curved, as shown in the figures. Alternatively, the upper surface of armrest 42 is sloping (inclined), or horizontal. Armrest 42 thus covers body 41 both in the home position and in the rest position. In addition, to form the whole armrest 42, the fabrication of armrest 42 and its assembly with body 41 is facilitated.

Alternatively, branch 425 of armrest 42 is separated and dissociated from the rest of the armrest 42. The armrest 42 therefore consists of two parts.

In the case where module 40 does not include branch 425, which constitutes the upper part of module 40 in the home position, it is the upper surface of module 40 that can be curved, sloping (inclined) or horizontal.

These characteristics of the upper part of module 40 or of the upper part of armrest 42 can be applied to all the embodiments of the invention.

Advantageously, as shown in FIGS. 1 to 3, armrest 42 is vertically slidable relative to body 41. It is adjustable in height between low and high positions when armrest module 40 is in the rest position.

Thus, regardless of the body type of the occupant of the seat 10, his forearm resting on armrest 42 will be at an optimal height relative to his chest, and the occupant will sit in a more comfortable position.

Armrest 42 is shown in the lower position in FIG. 2, and in the upper position in FIG. 3. The armrest 42 is translated vertically relative to body 41 between these two positions. In the low position, armrest 42 rests on body 41. In the high position, armrest 42 is able to be locked or unlocked by a locking mechanism (such as a snap), not shown, which supports the weight of the arm resting on armrest 42.

The armrest 42 is guided in its translation movement by two rods which slide in the housing of body 41. Alternatively, this guidance can be performed by a rod, or more than two rods.

When armrest 42 is L-shaped, leg 425 slides along body 41 in the passage of armrest 42 between the high and low positions, which contributes to guiding the armrest 42.

Advantageously, armrest 42 can be locked/unlocked in height in one or more intermediate positions between the high position and the low position.

Figure 4:
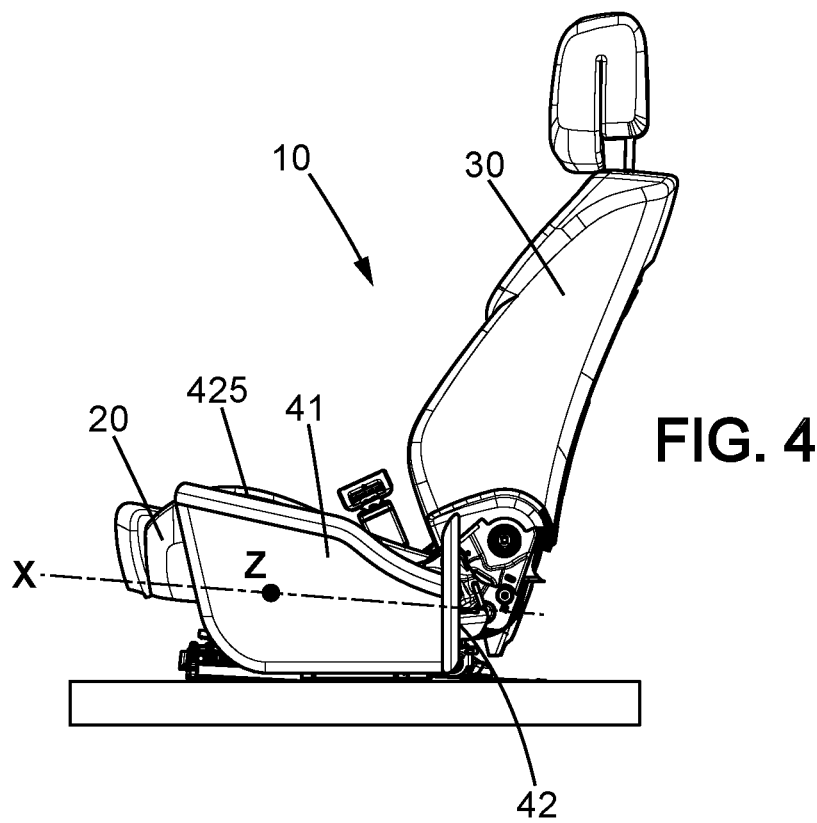
FIG. 4 is a side view of the seat according to another embodiment of the invention, with the armrest module in the home position.
Figure 5:
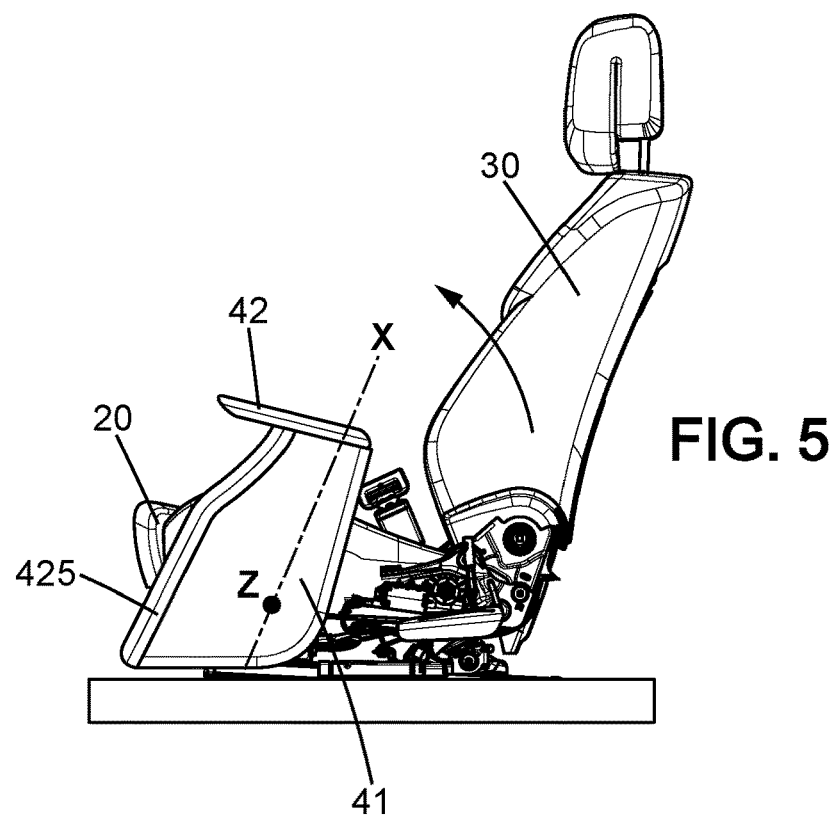
FIG. 5 is a side view of the seat of FIG. 4, with the armrest module in the rest position.
Figure 6:
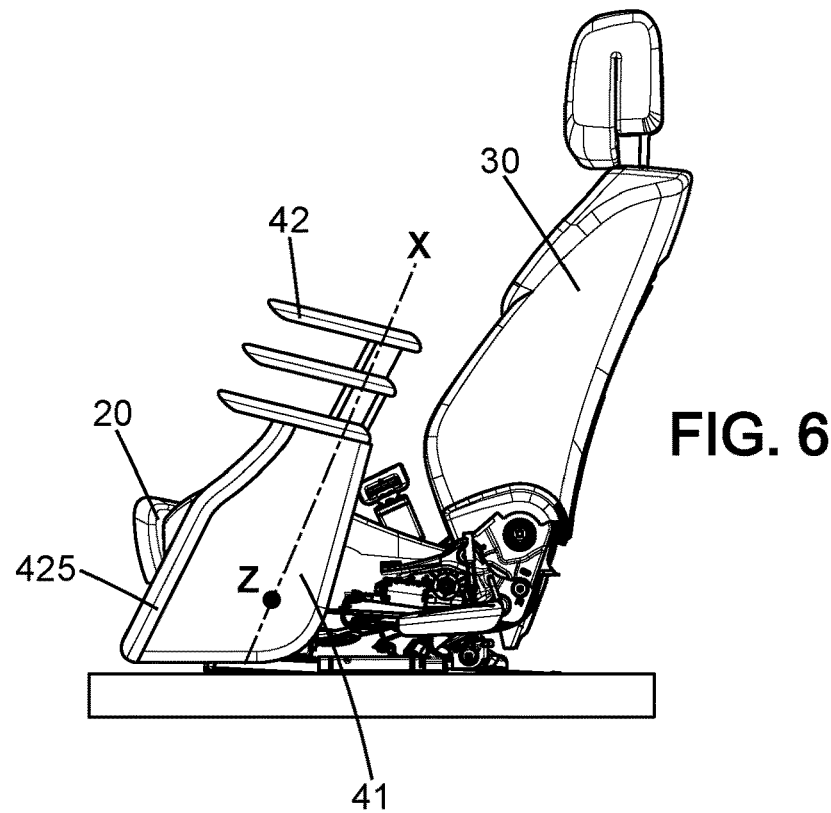
FIG. 6 is a side view of the seat of FIG. 4, with the armrest module in the rest position and the armrest in the raised position relative to the armrest body.
Figure 7:
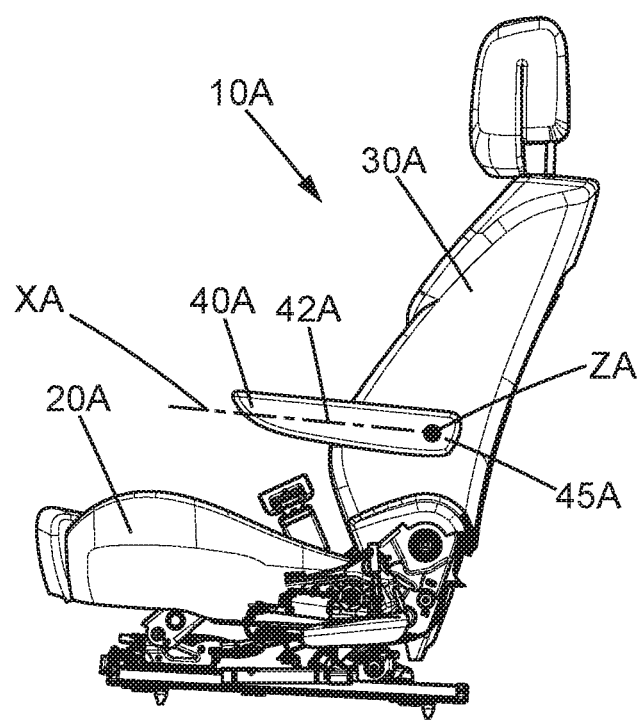
FIG. 7, already described, represents a seat according to the prior art.

FIGS. 4 to 6 show another embodiment of the invention.

In this embodiment, the passage of the armrest module 40 from the home position to the rest position is effected with a rotation of the rear part of module 40 towards the front of seat 20 and upwards to move this back part away from the backrest 30.

Optionally, as shown in FIGS. 4 to 6, the pivot axis Z of the pivot connection 45 is located in the front part (in the home position) of armrest module 40.

Thus, the front of armrest module 40 (in front of the pivot axis Z in the home position) is short and leaves free the lateral area of the front of seat 20, which allows easier passage of the legs of the occupant on seat 10 when he sits in a lateral position.

Module 40 is shown in FIG. 4 in the home position, and is shown in FIG. 5 in the rest position.

The pivot axis Z is perpendicular to the plane of the figure.

The rotational movement of module 40 is effected according to the arrow shown in FIG. 5, in the counterclockwise direction, with seat 20 located in the background of module 40.

As shown in FIGS. 4 to 6, branch 425 of armrest 42, which constitutes the upper part of module 40 in the home position, is dissociated from the rest of the armrest 42.

Thus, as shown in FIG. 5 where module 40 is in the rest position, branch 425 remains fixed while the rest of armrest 42 slides in the up position. In FIG. 5, an intermediate position between the low position and the high position is further shown.

Alternatively, the armrest has an L shape so that arm 425 forms a single block with the rest of the armrest 42.

Advantageously, the armrest module 40 includes a portion which constitutes a protection in the event of lateral impact.

For example, this part is a rigid reinforcement 49.

The rigid reinforcement 49 is integrated in body 41. It is shown in dashed lines in FIGS. 2 and 3.

"Rigid" refers to a material which is less deformable under identical stress than the materials forming the remainder of body 41. In the event of a lateral/transverse impact on the vehicle, reinforcement 49 acts as a piston which moves in block and push the occupant's pelvis away from the impact zone.

Thus, the occupant's pelvis, which is located behind the armrest module in a direction transverse to the seat, is better protected.

Advantageously, as represented in FIGS. 1 to 6, the armrest module 40 has an elongated shape along a longitudinal axis X, perpendicular to the pivot axis Z. The longitudinal axis X substantially extends horizontally in the home position and vertically in the rest position.

Thus, armrest module 40 has a shape in a plane perpendicular to the pivot axis Z which is close to that of seat 40.

In the description above, seat 10 comprises a single armrest module 40. Seat 10 may also comprise two modules 40, one of the modules 40 being located on one side edge of seat 20, the second of the modules 40 being located on the other side edge of seat 20.

The invention claimed is:

1. A vehicle seat comprising a backrest, a seat extending in a transverse direction from a first side edge to a second side edge, and a module, wherein said module comprises a body pivotably mounted on the seat and an armrest supported by said body and slidably mounted on said body, and wherein said module is able to move relative to said seat between a home position, in which said armrest extends laterally from the seat or is lower than the seat so as to be able to receive an occupant, and a rest position, in which said armrest is higher than said seat so as to be able to receive the arm of the occupant sitting on said seat, said module having a substantially flat shape in a vertical plane such that two dimensions of the module are each greater than a third dimension which is a thickness, with the thickness extending in said transverse direction, said armrest consisting essentially of one single part and having an L-shape in said vertical plane.

2. The vehicle seat set forth in claim 1 wherein said armrest is slidable vertically relative to said body to be adjustable in height between a low position and a high position when said module is in the rest position.

3. The vehicle seat set forth in claim 1 wherein the module is able to move relative to said seat with a movement that comprises a rotation with a pivot connection about a pivot axis Z directed transversely to said seat.

4. The vehicle seat set forth in claim 3 wherein said module is articulated by said pivot connection to said seat.

5. The vehicle seat set forth in claim 3 wherein passage of said module from the home position to the rest position is effected with a rotation of a front portion of said module towards a rear of the seat to bring said front portion closer to said backrest.

6. The vehicle seat set forth in claim 3 wherein passage of said module from the home position to the rest position is performed with a rotation of a rear portion of said module towards a front of the seat to move said rear portion away from said backrest.

7. The vehicle seat set forth in claim 1 wherein said armrest comprises a branch, which constitutes an upper part of said module in the home position.

8. The vehicle seat set forth in claim 1 wherein said module comprises a part which constitutes a protection in the event of lateral impact.

9. The vehicle seat set forth in claim 1 wherein said module has an elongated shape along a longitudinal axis X, and wherein the said longitudinal axis X extends substantially horizontally in said home position and extends substantially vertically in said rest position.

10. A vehicle seat having a backrest, a seat extending in a transverse direction from a first side edge to a second side edge, and a module, wherein said module comprises a body pivotably mounted on the seat and an armrest supported by said body and slidably mounted on said body, and wherein said module is able to move relative to said seat between a home position, in which said armrest extends laterally from said seat or is lower than said seat so as to be able to receive an occupant, and a rest position, in which said armrest is higher than said seat so as to be able to receive the arm of the occupant sitting on said seat, wherein said module, in the home position, does not protrude forward of a front end of said seat, said armrest consisting essentially of one single part extending in a vertical plane perpendicular to said transverse direction, and said module having a substantially flat shape in said vertical plane such that two dimensions of the module are each greater than a third dimension which is a thickness.

11. A vehicle seat, comprising:
a backrest;
a seat extending in a transverse direction from a first side edge to a second side edge; and
an armrest module comprising a body pivotably mounted on said seat and an armrest slidably mounted on the body,
wherein the armrest module is movable relative to said seat between a home position, in which the armrest extends laterally from said seat or is lower than said seat so that said seat is able to receive an occupant, and a rest position, in which the armrest is higher than said seat so that the armrest is able to receive an arm of the seated occupant,
wherein the armrest module is substantially flat with a thickness in the transverse direction and vertical and longitudinal dimensions greater than the thickness, said vertical and longitudinal dimensions parallel with a vertical plane, and
wherein the armrest has an L-shape in said vertical plane.

* * * * *